(12) United States Patent
Tu et al.

(10) Patent No.: US 12,159,551 B2
(45) Date of Patent: Dec. 3, 2024

(54) MEDICAMENT DELIVERY DEVICE DESIGN EVALUATION APPARATUS

(71) Applicant: SHL MEDICAL AG, Zug (CH)

(72) Inventors: Shih-Hsun Tu, Taoyuan (TW);
Hsueh-Yi Chen, New Taipei (TW);
Pei-Chi Hu, New Taipei (TW);
Chun-Yi Lee, Taoyuan (TW)

(73) Assignee: SHL Medical AG, Zug (CH)

( * ) Notice: Subject to any disclaimer, the term of this patent is extended or adjusted under 35 U.S.C. 154(b) by 0 days.

(21) Appl. No.: 18/015,374

(22) PCT Filed: Jul. 6, 2021

(86) PCT No.: PCT/EP2021/068639
§ 371 (c)(1),
(2) Date: Jan. 10, 2023

(87) PCT Pub. No.: WO2022/017777
PCT Pub. Date: Jan. 27, 2022

(65) Prior Publication Data
US 2023/0282134 A1 Sep. 7, 2023

(30) Foreign Application Priority Data
Jul. 24, 2020 (EP) ..................................... 20187630

(51) Int. Cl.
*G09B 23/28* (2006.01)
(52) U.S. Cl.
CPC .................................. *G09B 23/285* (2013.01)

(58) Field of Classification Search
CPC ................................................... G09B 23/285
See application file for complete search history.

(56) References Cited

U.S. PATENT DOCUMENTS

| 5,771,181 | A | 6/1998 | Moore et al. |
| 6,793,496 | B2 | 9/2004 | Edic et al. |
| 7,371,067 | B2 | 5/2008 | Anderson et al. |
| 7,856,343 | B2 | 12/2010 | Jo et al. |
| 8,666,714 | B2 | 3/2014 | Whirley et al. |

(Continued)

FOREIGN PATENT DOCUMENTS

| EP | 2869257 A1 | 5/2015 |
| EP | 3545993 A1 | 10/2019 |

(Continued)

OTHER PUBLICATIONS

International Search Report and Written Opinion for Int. App. No. PCT/EP2021/068639, mailed Sep. 29, 2021.

(Continued)

*Primary Examiner* — Robert P Bullington
(74) *Attorney, Agent, or Firm* — McDonnell Boehnen Hulbert & Berghoff LLP (57) ABSTRACT

A medicament delivery device design evaluation apparatus is presented having a plurality of electronic demonstration units, wherein each electronic demonstration unit comprises a set of electronics, the set of electronics comprising a data receiver and at least one of an indication unit and a data transmitter, wherein the plurality of electronic demonstration units are configured to provide an indication when at least one of the plurality of electronic demonstration units receives a control signal.

18 Claims, 8 Drawing Sheets

(56) References Cited

U.S. PATENT DOCUMENTS

| | | | |
|---|---|---|---|
| 10,049,396 B2 | 8/2018 | Subbarayan et al. | |
| 2004/0142315 A1 | 7/2004 | Bumann et al. | |
| 2006/0073455 A1 | 4/2006 | Buyl et al. | |
| 2015/0170545 A1 | 6/2015 | Baker et al. | |
| 2021/0023299 A1* | 1/2021 | Gentz | G08C 19/16 |

FOREIGN PATENT DOCUMENTS

| | | |
|---|---|---|
| JP | 2003-216657 A | 7/2003 |
| KR | 10-1018481 B1 | 3/2011 |

OTHER PUBLICATIONS

Anonymous, "Pharmapack Drug Delivery & Packaging—Innovation Gallery eBook 2020", (Mar. 31, 2020), pp. 1-30, URL: https://www.pharmapackeurope.com/content/dam/Informa/pharmapackeurope/en/2020/pdf-files/HLN20PPE-SP-EN-Innovation-Gallery-eBook.pdf, (Jan. 22, 2021), XP055768075 [I] 1-15 * p. 17.

* cited by examiner

MEDICAMENT DELIVERY DEVICE DESIGN EVALUATION APPARATUS

CROSS REFERENCE TO RELATED APPLICATIONS

The present application is a U.S. National Phase Application pursuant to 35 U.S.C. § 371 of International Application No. PCT/EP2021/068639 filed Jul. 6, 2021, which claims priority to European Patent Application No. 20187630.7 filed Jul. 24, 2020. The entire disclosure contents of these applications are herewith incorporated by reference into the present application.

TECHNICAL FIELD

The present disclosure generally relates to a design evaluation apparatus, especially a medicament delivery device design evaluation apparatus.

BACKGROUND

Portable medicament delivery devices such as auto-injectors, inhalers and on-body devices are generally known for the self-administration of a medicament by patients without formal medical training or for emergency use. For example, patients suffering from diabetes or people undertaking an artificial fertilization procedure may require repeated injections of insulin or a hormone. Other patients may require regular injections of other types of medicaments, such as a growth hormone. To reduce cost, it is common to design and manufacture the medicament delivery devices in purely or mainly a mechanical way.

However, there are still some needs that can only be done or are better done in an electronic way, such as providing a more significant or sequential indication to the users, or sensing a condition related to a single medicament delivery device; especially when a user compliance issue has been raised and discussed. Therefore, there will be a demand for communication between the mechanical engineer and the electronic engineer during the design planning phase. Especially since medicament delivery devices are regulated by a strict regulation in most jurisdictions, any slight design modification on a product that has been certified with a marketing authorization will need to pass a lot of tests, e.g. safety, effect, impact on the existing product, and even a slight change of the design may cost a lot to be implemented into the product. Therefore, there is a demand for facilitating the communication between the mechanical engineer and the electronic engineer during the design planning phase so that a design modification on the final product, especially the launched product, can be reduced.

A common way of a design communication between different teams of engineers, e.g. mechanical, electronic and/or human factor study teams, may include a pure discussion with vague idea, a paper-based technology survey, a discussion with some information about the idea, making a rough prototype, discussing the prototype, modifying the prototype and discussing the prototype again.

Significant time may be used for the stage of discussing and modifying the prototype, because different engineers may have different expectations about what the design should look like; and when the prototype doesn't match with all the engineers' expectations, there may be a need to modify the prototype. However, the prototype usually cannot be made during the discussion in only few minutes. It also costs a lot of money to repeatedly make different prototypes with some selected electronic functions.

To mitigate this problem, a computer-implemented program can be used. The computer-implemented program can be demonstrated during the discussion and can be modified during the discussion. However, the simulation on a monitor of a computer may not truly reflect how the design in question will look like in a real mechanical device. For example, a light indication with different light cover will look different on different colored plastic components and may look different under different ambient light conditions. Also, with a vibration indication it may be difficult to evaluate the feeling that an end user may have through the software simulation.

SUMMARY

The present disclosure is defined by the appended claims, to which reference should now be made.

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial" refer to a direction extending from the proximal end to the distal end, typically along the device or components thereof in the direction of the longest extension of the device and/or component.

Similarly, the terms "transverse", "transversal" and "transversally" refer to a direction generally perpendicular to the longitudinal direction.

Further, the terms "circumference", "circumferential", "circumferentially", "rotation", "rotational" and "rotationally" refer to a direction generally perpendicular to the longitudinal direction and at least partially extending around the longitudinal direction.

In this application, the user(s) generally mean people who participate in a design process to develop a medicament delivery device, e.g. engineers or designers.

There is hence provided a medicament delivery device design evaluation apparatus comprising: a plurality of electronic demonstration units, wherein each electronic demonstration unit comprises a set of electronics, the set of electronics comprising a data receiver and at least one of an indication unit and a data transmitter; wherein the plurality of electronic demonstration units are configured to provide an indication when at least one of the plurality of electronic demonstration units receives a control signal.

Instead of a virtual simulation shown on a monitor of a computer, such medicament delivery device design evaluation apparatus allows the user to select an indication, and how to show such indication; or select a plurality of indications being shown at the same time or sequentially; and then observe the indication(s) in the real environment.

According to one embodiment, the indication is one of a visual indication provided by the indication unit when the set of electronics comprises an indication unit, an audible indication provided by the indication unit when the set of electronics comprises an indication unit, a tactile indication provided by the indication unit when the set of electronics comprises an indication unit and a message sent by the data transmitter when the set of electronics comprises a data transmitter; or any combination thereof.

According to one embodiment, the medicament delivery device design evaluation apparatus comprises a control device configured to send the control signal to at least one of the plurality of electronic demonstration units.

According to one embodiment, the control device comprises a user interface, a communication unit, a memory that stores a set of instructions for evaluating a design of a medicament delivery device, and one or more processors; the one or more processors are configured to use the set of instructions to: receive a user input from the user interface; send the control signal based on the user input, wherein the control signal is sent from the communication unit to the data receiver of at least one of the plurality of electronic demonstration units.

According to one embodiment, the control device can be a computer, a tablet computer, a smart phone or a server.

According to one embodiment, the set of electronics of at least one of the plurality of electronic demonstration units comprises a sensor.

According to one embodiment, each electronic demonstration unit comprises a housing; wherein the set of electronics is arranged in or on the housing.

According to one embodiment, each electronic demonstration unit comprises a battery arranged in or on the housing.

According to one embodiment, the battery can be a single use battery or rechargeable battery; the rechargeable battery can be charged by wire or through a wireless charging station.

According to one embodiment, the plurality of electronic demonstration units comprises a housing; and wherein all of the plurality of electronic demonstration units are arranged in or on the housing.

According to one embodiment, the plurality of electronic demonstration units are detachable from the housing.

According to one embodiment, the housing can be a cube shape or a shape of a medicament delivery device.

According to one embodiment, each electronic demonstration unit comprises a processor.

According to one embodiment, some of the plurality of electronic demonstration units are arranged to connect with a processor.

According to one embodiment, the user input comprises an event for being detected by the sensor; and the at least one of an indication unit and a data transmitter in the electronic demonstration unit is configured to provide the indication in accordance with the user input when at least one of the plurality of electronic demonstration units receives the control signal and the event has been detected.

According to one embodiment, the event for being detected by the sensor is an event related to handling of a medicament delivery device, such as a start or end of end of medicament delivery sequence, a skin contact, an ambient temperature, a shaking of the medicament delivery device and a illumination of environment.

According to one embodiment, the sensor is at least one of a vibration sensor, microphone, gyroscope, accelerometer, inertia sensor, proximity sensor, light sensor, temperature sensor, image sensor, capacitance sensor, impedance sensor and gesture sensor.

According to one embodiment, one of the plurality of electronic demonstration units comprises a data transmitter configured to send a secondary control signal after receiving the control signal, and the data receiver of each of the other electronic demonstration units is configured to receive the secondary control signal.

According to one embodiment, each indication unit is at least one of a display, a light generator, a speaker, a buzzer, a temperature conditioner, and a vibration generator.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

Embodiments of the present concept will now be described, by way of example only, with reference to the accompanying drawings, in which.

DETAILED DESCRIPTION

Figure 1:
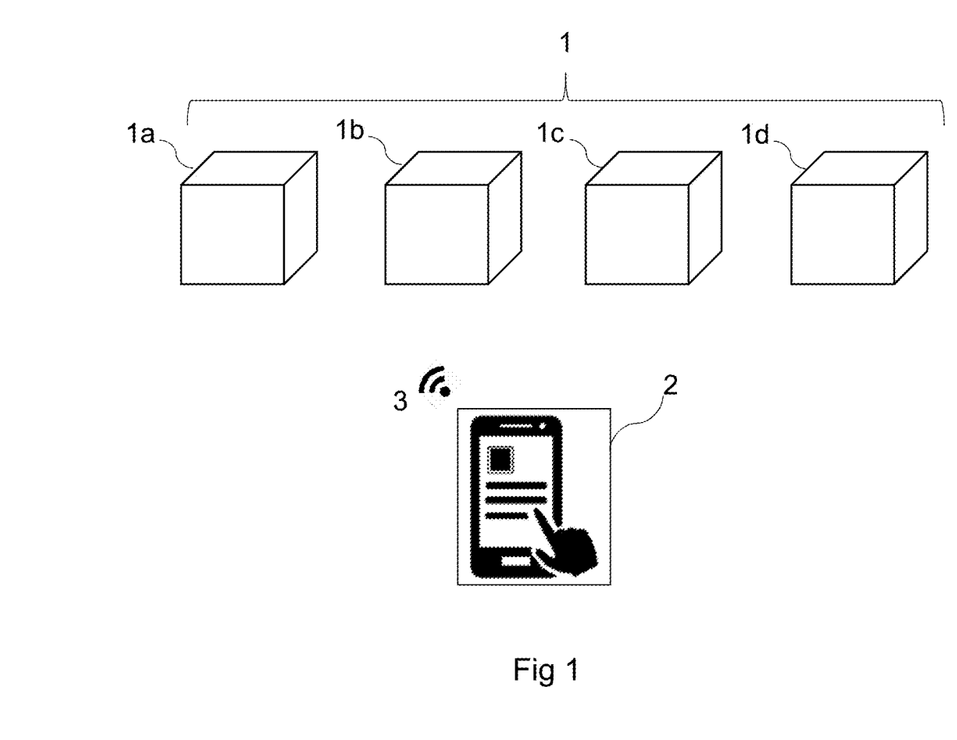
FIG. 1 schematically shows an example of a medicament delivery device design evaluation apparatus comprising a plurality of electronic demonstration units.

A medicament delivery device design evaluation apparatus comprises a plurality of electronic demonstration units. Each electronic demonstration unit comprises a set of electronics, the set of electronics comprising a data receiver and at least one of an indication unit and a data transmitter. The plurality of electronic demonstration units, as illustrated as cubes in FIG. 1, is configured to provide an indication to a user when a control signal 3 has been received by the data receiver of at least one of the plurality of electronic demonstration units. The medicament delivery device design evaluation apparatus comprises a control device 2 for sending the control signal 3 to the medicament delivery device design evaluation apparatus 1. The control device 2 can be for example a smart phone, a computer or a pad computer. The control device 2 comprises a communication unit, a memory configured to store a set of instructions for evaluating a design of a medicament delivery device, and one or more processors. The communication unit of the control device 2 and the data receiver and transmitter of the plurality of electronic demonstration units may be based on a wireless communication technology, e.g. GPRS, 3G, 4G, 5G, WiFi, Low Power Wide Area (LPWA), Bluetooth, Zigbee, RFID, or NFC, but it can also be based on a wired communication technology for data transmission.

Also, the set of electronics of at least one of the plurality of electronic demonstration units can comprise a sensor. The sensor can be at least one of a vibration sensor, microphone, gyroscope, accelerometer, inertia sensor, proximity sensor, ultrasonic sensor, light sensor, temperature sensor, image sensor, capacitance sensor, impedance sensor and gesture sensor. The sensor is configured to detect an event related to handling of medicament delivery devices, such as a start or end of a medicament delivery sequence, a skin contact, an ambient temperature (if the medicament should be stored in certain temperature, the user may want to arrange a high temperature alarm), a shaking of the medicament delivery device and a illumination of environment (if the medicament is sensitive to the light, the user may want to arrange an exposure alarm).

The control device 2 is configured to send the control signal 3 to at least one of the plurality of electronic demonstration units of the medicament delivery device design evaluation apparatus, so that the medicament delivery device design evaluation apparatus 1 will provide an indication via at least one of the plurality of electronic demonstration units. Such an indication can be one of a visual indication, an audible indication and a tactile indication demonstrated by the indication unit or a signal sent by the data transmitter or any combination thereof presented together or sequentially.

Each one of the electronic demonstration units typically has a printed circuit board (PCB), with the set of electronics including the data receiver and the at least one of an indication unit and a data transmitter, and also the sensor (if any) arranged on the PCB. The medicament delivery device design evaluation apparatus may comprise one or more housings. The plurality of electronic demonstration units may be arranged within the one or more housings.

Figure 2A:
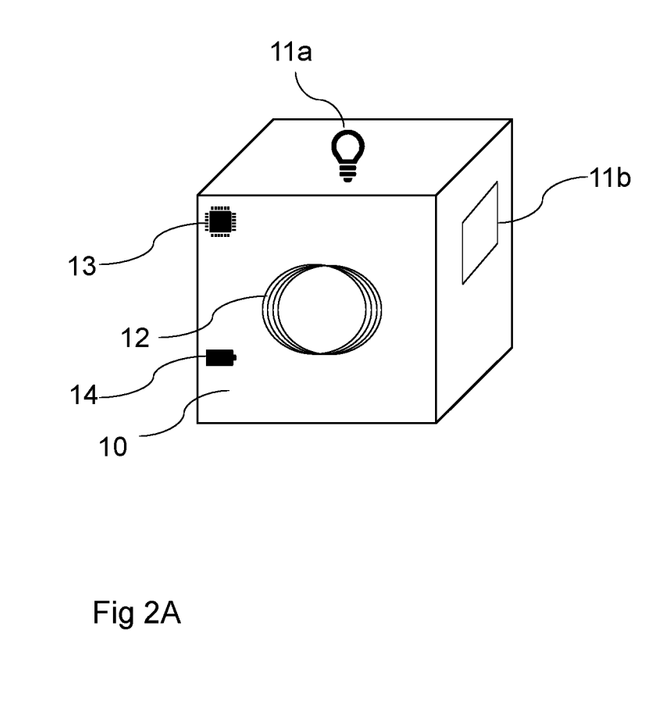
FIG. 2A schematically shows a perspective view of an electronic demonstration unit of the medicament delivery device design evaluation apparatus of FIG. 1.
Figure 2B:
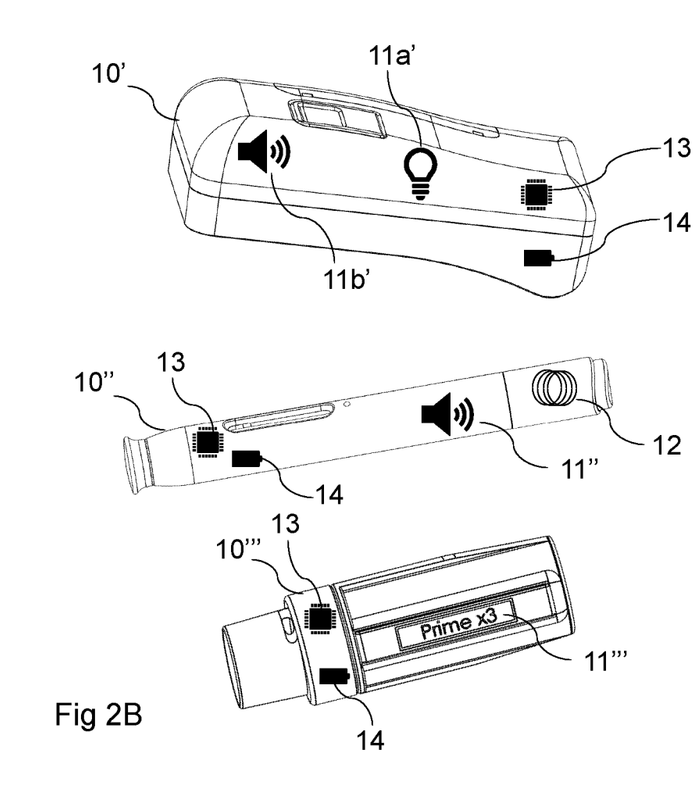
FIG. 2B schematically shows a perspective view of an electronic demonstration unit of a medicament delivery device design evaluation apparatus in another embodiment.
Figure 3A:
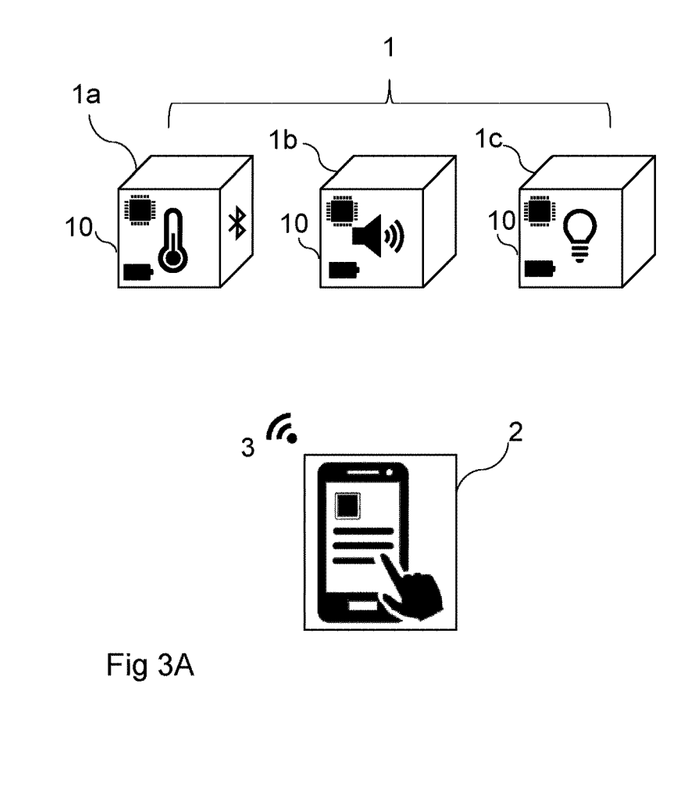
FIG. 3A schematically shows a perspective view of the medicament delivery device design evaluation apparatus of FIG. 1.

In a preferred embodiment, each one of the plurality of electronic demonstration units of the medicament delivery device design evaluation apparatus 1 has its own housing 10; 10'; 10"; 10''', as shown in FIGS. 2A, 2B and 3A. The housings for each one of the electronic demonstration units are independent units relative to each other, as shown in FIG. 3A. The electronic demonstration units can be respectively arranged within each of the housings, each of the housings may comprise a sealable opening, e.g. sealed by a lid.

FIG. 2A-2B illustrate example demonstration units of the plurality of electronic demonstration units, with each demonstration unit having one or more indication units; as an example, a demonstration unit comprises a housing 10, 10', 10", 10'''; one or more indication units 11a, 11b; 11a', 11b'; 11"; 11'''; a data transmitter 12; a processor 13 and a battery 14. The indication units on one electronic demonstration unit can be different types of indication unit, for example, LED array and E-Ink display; or LED array and buzzer.

Figure 3B:
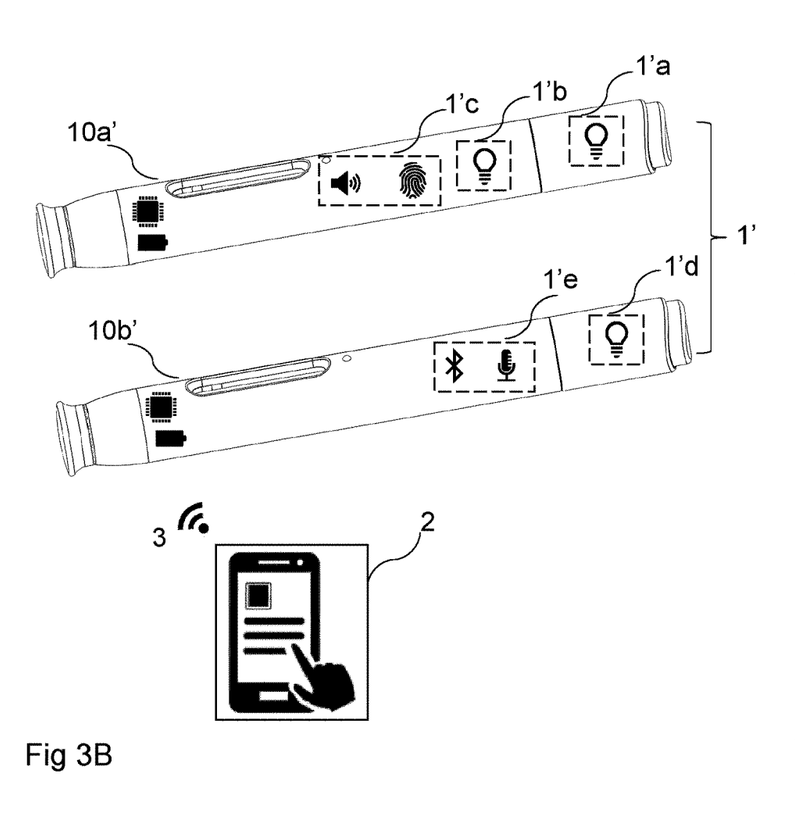
FIG. 3B schematically shows a perspective view of a medicament delivery device design evaluation apparatus comprising a plurality of electronic demonstration units in another embodiment.

Alternatively, some of the plurality of electronic demonstration units of the medicament delivery device design evaluation apparatus 1' can be arranged within one housing, and some others of the plurality of electronic demonstration units can be arranged within another housing. For example, as shown in FIG. 3B, the plurality of electronic demonstration units comprises a first housing 10a' and a second housing 10b'. A first group of the electronic demonstration units comprises some electronic demonstration units 1'a, 1'b, 1'c, arranged within the first housing 10a'. Two of the electronic demonstration units 1'a, 1b' in the first group respectively comprise an indication unit, e.g. a LED; another electronic demonstration unit 1'c comprises an indication unit, e.g. a buzzer, and a sensor, e.g. a fingerprint sensor.

A second group of the electronic demonstration units comprises the electronic demonstration units 1'd and 1'e, arranged within the second housing 10b'. One of the electronic demonstration units 1'd comprises an indication unit; the other one of the electronic demonstration units 1'e comprises a data transmitter, e.g. a Bluetooth unit, and a sensor, e.g. a microphone.

In this case, two different sequences and the combination of indications can be provided at the same time, so a parallel comparison can be therefore provided to the user.

Figure 7:
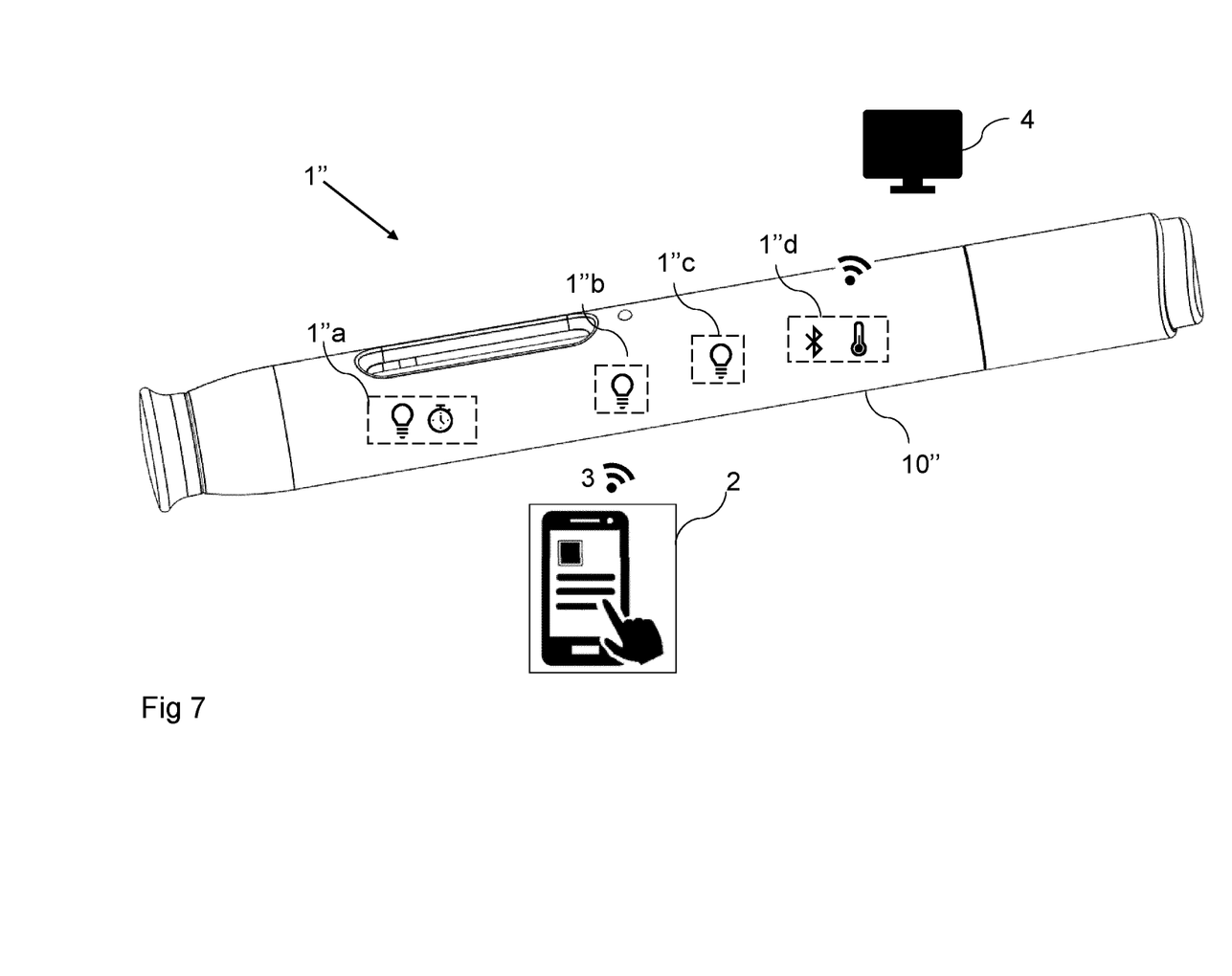
FIG. 7 schematically shows a medicament delivery device design evaluation apparatus comprising a plurality of electronic demonstration units in another embodiment.

In another example, the plurality of electronic demonstration units of the medicament delivery device design evaluation apparatus 1" can only have one housing 10", as shown in FIG. 7, so that all electronic demonstration units are arranged within the housing 10".

The housings may be non-detachable or detachable in relation to the plurality of electronic demonstration units. The former may be easy to use for the user; the latter may be more flexible for the user, since the user is able to change the housing based on his/her needs.

The housing may have a shape and color depending on different type of medicament delivery devices in the market. As shown in FIG. 2B, the housing 10', 10", 10''' can be made with shapes of different types of medicament delivery device, such as on-body device 10', handhold injector 10" and inhalation device 10'''. For example, if the user wants to see a green, blinking LED light on an on-body device/infusion pump device, the user may have a housing 10' with a shape of an on-body device/infusion pump device, and arrange an electronic demonstration unit with such indication unit into that housing 10'.

The housings 10 can also be a cube, as shown in FIG. 2A, 3A, which also allows up to six different indications, especially visual indications, to be independently presented on the six surfaces of the cube.

The housing can also be just simply printed, e.g. by a 3D printer, by the user based on his/her own demand about the shape of the housing.

Each indication unit can be at least one of a display, (e.g. LCD or E-Ink); a light generator, (e.g. LED; a speaker; a buzzer); a temperature conditioner, (e.g. Peltier conditioner); or a vibration generator.

In a preferred embodiment, each one of the plurality of electronic demonstration units of the medicament delivery device design evaluation apparatus 1; 1'; 1" is configured to present a different indication, such as a visual, audible, tactile indication; sending a SMS/app message (e.g. to a remote server or a personal mobile phone) by the data transmitter as an indication to the user.

In a preferred example, each one of the plurality of electronic demonstration units of the medicament delivery device design evaluation apparatus 1; 1'; 1" is configured to present one type of indication or one combination of indication types. In this embodiment, it can prevent any confusion for the user, because each of the indications can be individually observed or have a parallel comparison with another indication.

Each one of the plurality of electronic demonstration units may have a processor, as shown in FIGS. 2A, 2B and 3A, especially if each one of the plurality of electronic demonstration units 1 is respectively arranged within a respective housing, or if some of the plurality of electronic demonstration units are detachably arranged within one or several housings. Alternatively, some of the plurality of electronic demonstration units of the medicament delivery device design evaluation apparatus 1' can share one processor, as shown in FIG. 3B; or all of the plurality of electronic demonstration units of the medicament delivery device design evaluation apparatus 1" can share one processor, as shown in FIG. 7, especially where those electronic demonstration units are non-detachable and arranged within one housing 10a', 10b'; 10".

As shown in FIGS. 2A, 2B and 3A, each one of the plurality of electronic demonstration units of the medicament delivery device design evaluation apparatus 1 may have a battery, e.g. a single use battery or a rechargeable battery that can be charged wirelessly or by wire, especially if each one of the plurality of electronic demonstration units is respectively arranged within a respective housing. Alternatively, some or all of the plurality of electronic demonstration units of the medicament delivery device design evaluation apparatus 1'; 1" can share one battery, as shown in FIG. 3B or FIG. 7, especially electronic demonstration units that are non-detachable or detachably arranged in one or several housings.

The plurality of electronic demonstration units of the medicament delivery device design evaluation apparatus 1; 1'; 1" is configured to demonstrate the demonstrated indication when at least one of the plurality of electronic demonstration units receives the control signal 3.

Figure 4:
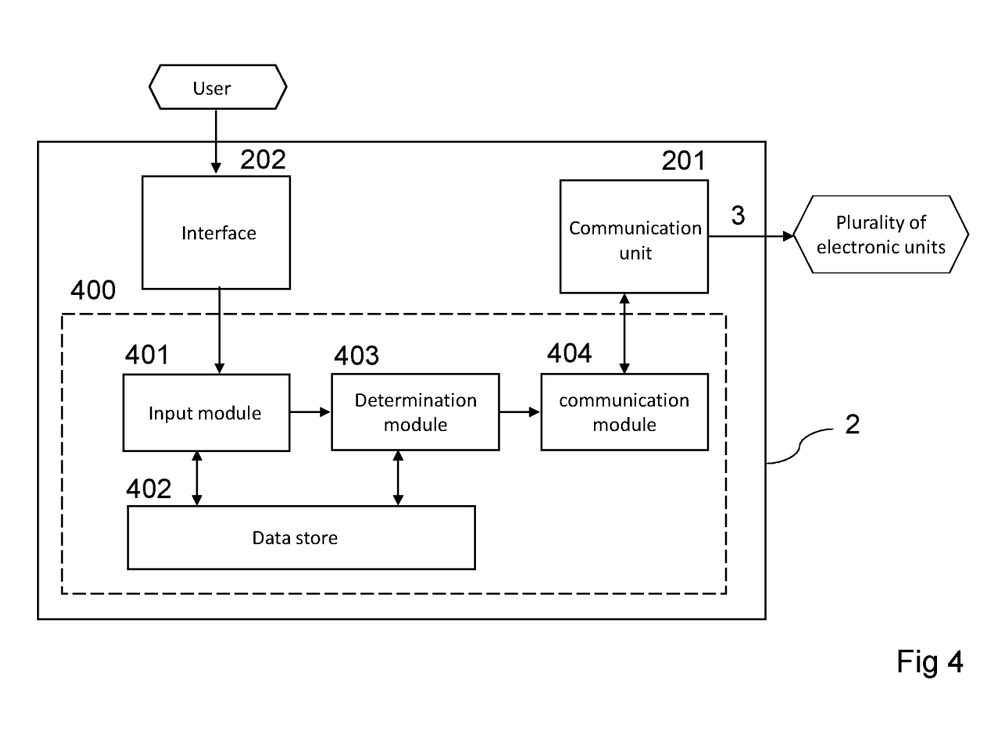
FIG. 4 schematically shows a computer-implemented application for controlling the medicament delivery device design evaluation apparatus in a control device.

For generating the control signal 3, the control device 2 should be installed with a computer-implemented application, the computer-implemented application is formed by a set of instructions. As shown in FIG. 4. the application 400 is designed with an input module 401; a data store 402; a determination module 403 and a communication module 404. The computer-implemented application may optionally have other functional modules, for example, at least one of a register module, image recognition module, voice recognition module, QR code interpretation module, bar code interpretation module, Optical Character Recognition (OCR) module and Augmented Reality (AR) module.

The input module 401 is configured to receive a user input via a user interface 202 of the control device 2. In a preferred embodiment, the input module 401 displays selections or use guidance on the user interface 202 based on the data in the data store 402. The data store 402 is configured to store data related to the design evaluation of a medicament delivery device. For example, connection data, (e.g. communication addresses of each single electronic demonstration unit of the plurality of electronic demonstration units); identification data, (e.g. identifiers of each single electronic demonstration unit of the plurality of electronic demonstration units); data about type or amount of indication units, type or amount of sensors of each single electronic demonstration unit of the plurality of electronic demonstration units; data about events can be detected by the plurality of electronic demonstration units; data about one or several different medicament delivery devices; and data about one or several different time periods. These time periods may depend on the features of different medicament delivery devices, such as data on injection time, data on priming time, data on inhalation time, data on waiting time (the short time period between two intakes of medicament by the same medicament delivery device). Those different time periods may be used to simulate some specific events of different medicament delivery devices together with the indication selection, for example, to simulate a medicament delivery progress indication and/or an end of a medicament delivery indication. The data in the data store can be manually or automatically updated from a cloud server or manually input through the user interface of the control device 2.

The determination module 403 is configured to retrieve data from the data according to the user input from the input module 401, and the determination module 403 is configured to determine the control signal 3 based on the the user input from the input module 401 and the retrieved data. The communication module 404 is configured to receive connection data, e.g. a communication address of the at least one of the plurality of electronic demonstration units, and the control signal 3 from the determination module 403; the communication module 404 is then configured to send the control signal 3 to the at least one of the plurality of electronic demonstration units.

Figure 5A:
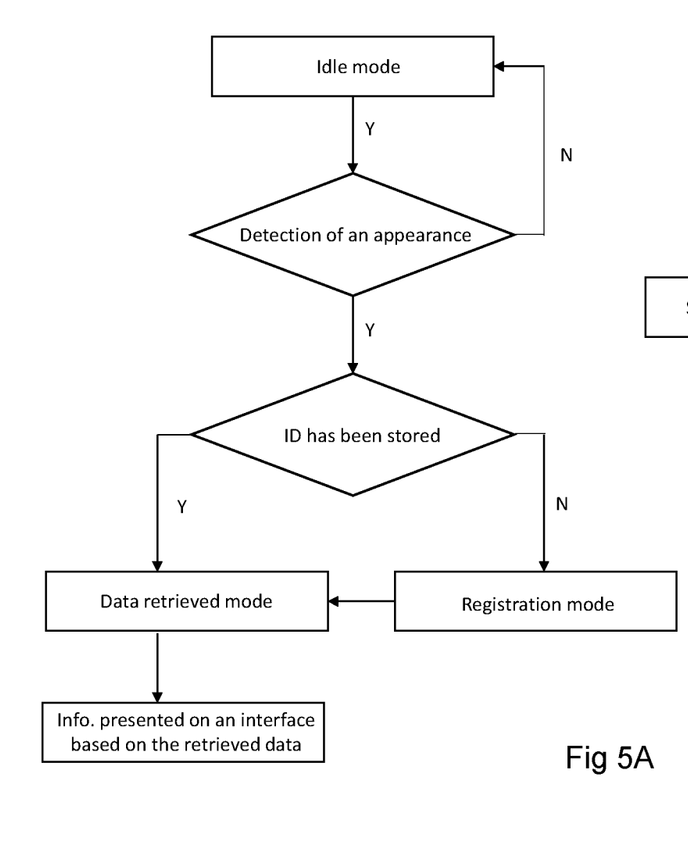
FIGS. 5A-5B shows a flow chart illustrating an embodiment of the present disclosure.
Figure 5B:
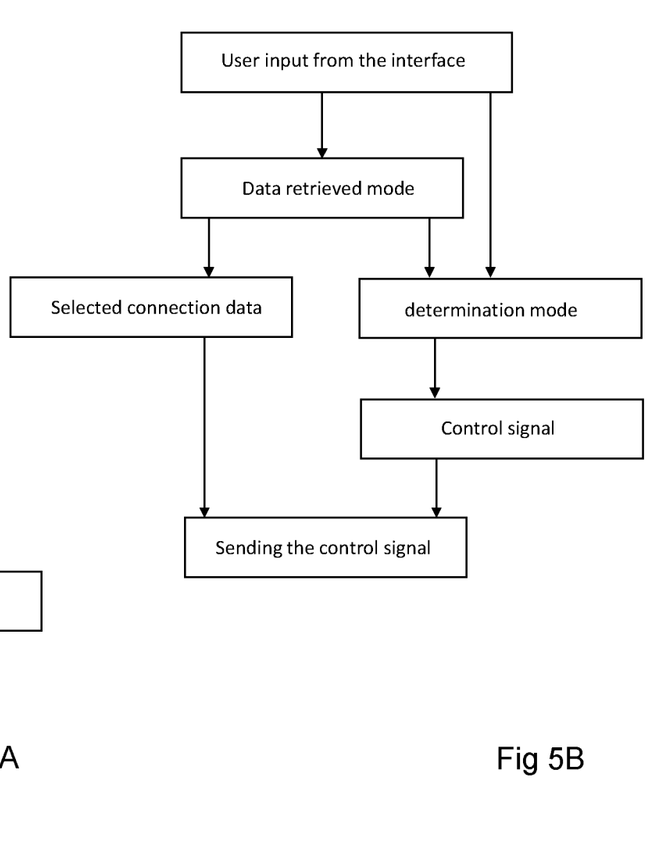

In use, the computer-implemented application, as shown in FIG. 5A-5B, will first detect whether at least one of the plurality of electronic demonstration units has appeared, e.g. showing up within a communication range. If there is an appearance of the electronic demonstration unit, then the next step is identifying whether the electronic demonstration unit has been registered, e.g. whether the identifier of the electronic demonstration unit has been stored. If yes, the input module may retrieve the data from the data store, according to the identifier, and display information, e.g. icons, selections, user guidance, on the user interface of the control device 2. If not, a registration process will be started. These steps can be done in the determination module or the optional register module.

The registration can be done by pairing or by using the control device 2 to scan the QR codes or bar codes on one or several housings that seal the plurality of electronic demonstration units, dependent on the communication technology used between the plurality of electronic demonstration units and the control device 2, so that the identifiers of each one of the plurality of electronic demonstration unit can be downloaded to or interpreted by the control device 2 and then sent to the data store.

When the user makes an input on the user interface of the control device 2, the determination module will retrieve data from the data store based on the user input and the identifier(s), the determination module determines the control signal 3 based on the user input and the retrieved data, the determination module then sends the connection data and the control signal 3 to the communication module for sending the control signal 3 to at least one of the plurality of electronic demonstration units according to the connection data.

The input module may generate a graphical user interface (GUI) when the control device 2 is arranged with a screen. The GUI may show several icons in accordance with the data about plurality of electronic demonstration units from the register module and the data from the data store. The user may be able to provide an input by, for example, clicking on one or some of those icons. The input may include a selection of the type of medicament delivery device; the type of the indication(s), e.g. visual indication, audible indication, tactile indication and/or sending a message as an indication; the appearance of the selected indication(s), e.g. the color of the light, volume of the sound, what kind of sound, magnitude of vibration; the event(s) to be indicated, e.g. medicament delivery progress indication, end of a medicament delivery indication; the type of sensor, e.g. gesture sensor or proximity sensor; and/or the event for being detected by the selected sensor, e.g. contact with user's skin.

Alternatively, the input module may have a voice recognition sub-module. In this case, the user may provide input by verbally instructing the control device 2.

Further, in another example, the input module may also connect with an AR module, so that when the user provides input, a virtual medicament delivery device with the components selected by the user, e.g. the types of indication or the appearance of the selected indication, can be displayed by the AR module; the user is therefore able to have an idea about how his/her choice may look like in the environment.

Figure 6A:
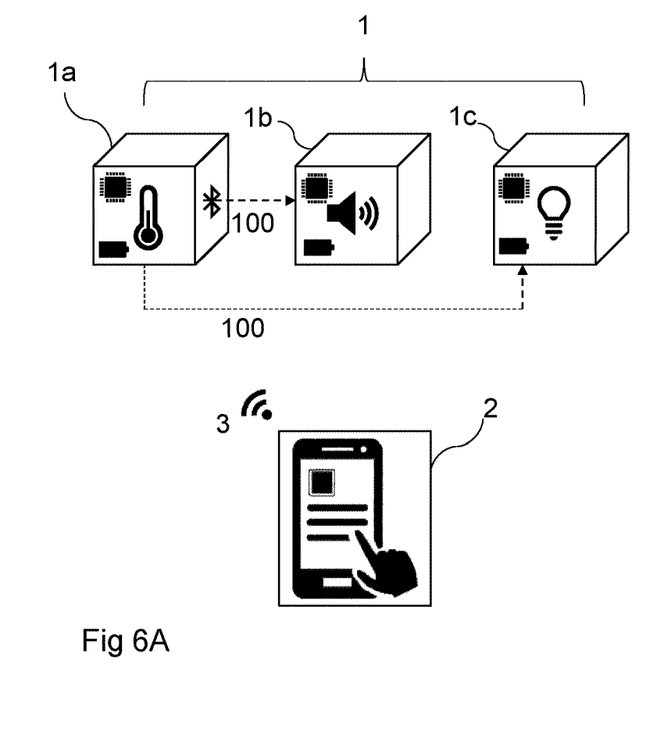
FIG. 6A-6B schematically shows the medicament delivery device design evaluation apparatus of FIG. 1, comprising a plurality of electronic demonstration units.
Figure 6B:
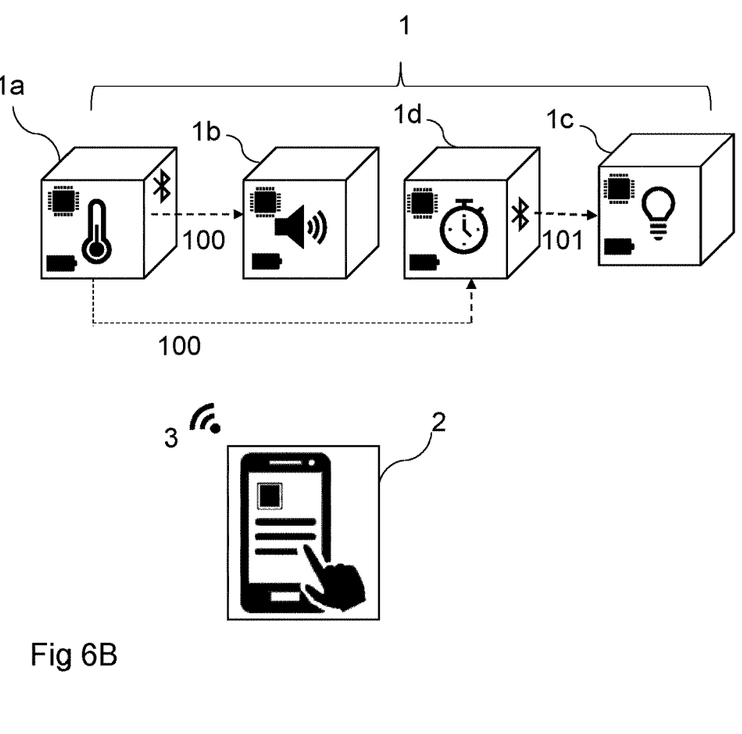

FIG. 6A-6B illustrate one example of using the medicament delivery device design evaluation apparatus 1. Each one of the plurality of electronic demonstration units in this example comprises a housing, a processor and a battery. A first electronic demonstration unit 1*a* comprises a temperature sensor and a data transmitter; a second electronic demonstration unit 1*b* comprises a buzzer; and a third electronic demonstration unit 1*c* comprises a LED light array.

The user may have an input on the user interface of the control device 2; such user input may be: a) detecting skin contact; b) using a temperature sensor to detect skin contact; c) providing a beep sound and a green light. The control signal 3 is sent to the first electronic demonstration unit 1*a*, so that when the first electronic demonstration unit 1*a* detects a predetermined temperature, e.g. determining by programming on the first electronic demonstration unit 1*a*; or data from the data store which is sent together with the control signal 3, the first electronic demonstration unit 1*a* sends a secondary control signal 100 to the second and third electronic demonstration units 1*b*, 1*c* to generate an audible and a visual indication, as shown in FIG. 6A. Also, the user may then want to remove the green light when the contact of skin has been detected but use that green light to indicate the end of medicament delivery sequence. The user may make a second input on the user interface of the control device 2, such second user input may be: a) detecting skin contact; b) using a temperature sensor to detect the skin contact; c) providing a beep sound; d) a medicament delivery time period (e.g. 10 second or depends on the different targeted medicaments); e) providing a green light.

As shown in FIG. 6B, a fourth electronic demonstration unit 1*d* comprises a data transmitter and a clock, e.g. an LCD display digitally showing a clock or a countdown, so that when the first electronic demonstration unit 1*a* detects a predetermined temperature, the first electronic demonstration unit 1*a* sends a secondary control signal 100 to the second and fourth electronic demonstration units 1*b*, 1*d* to generate an audible indication (the beep sound) and to start to count the medicament delivery time period. Once the time period has passed, the fourth electronic demonstration unit 1*d* sends a further control signal 101 to the third electronic demonstration unit 1*c* to generate a visual indication (the green light).

Figure 8:
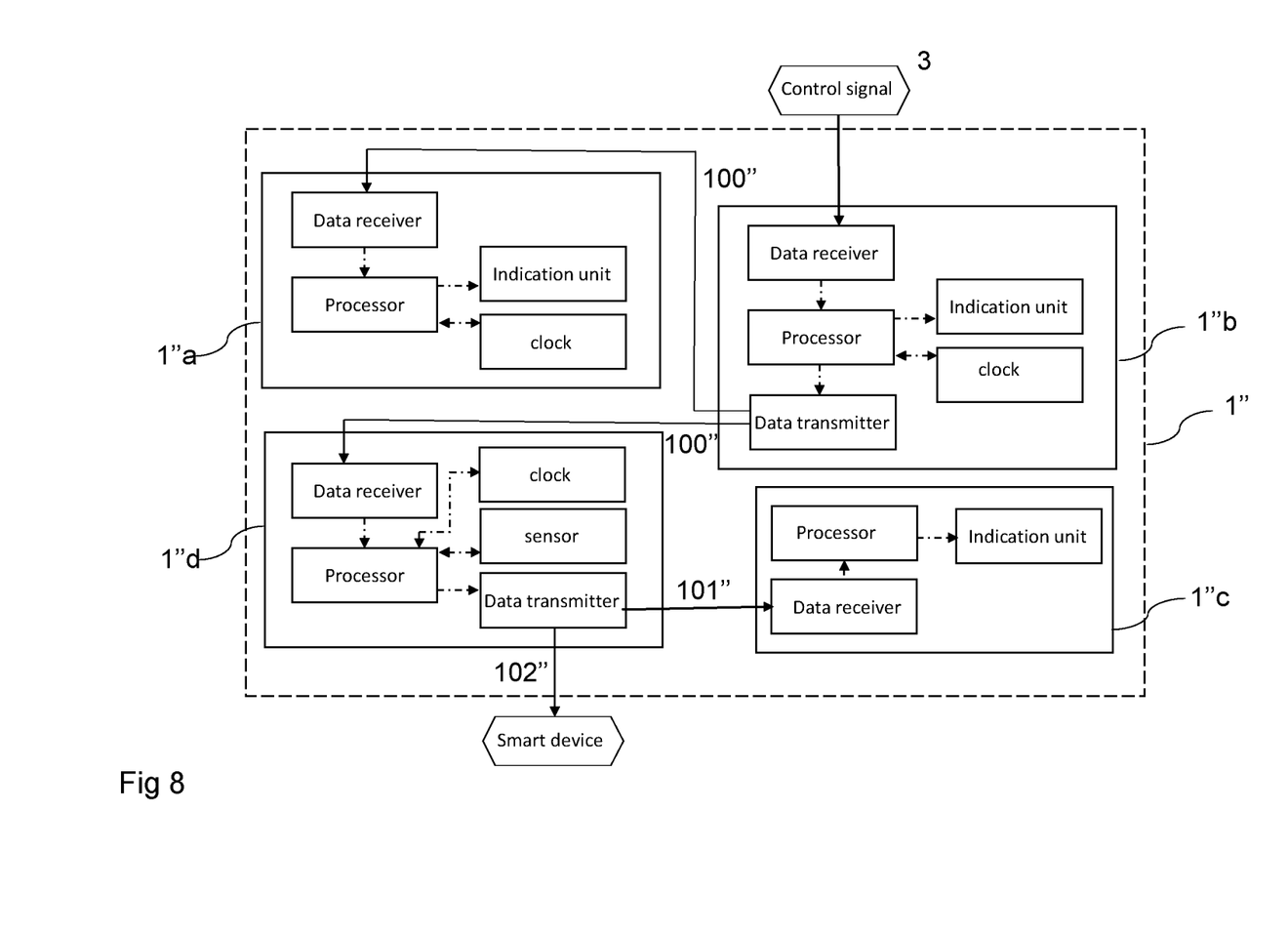
FIG. 8 schematically shows a scenario of the medicament delivery device design evaluation apparatus of FIG. 7.

Another example of using the medicament delivery device design evaluation apparatus 1" is shown in FIG. 7-8. In this example, the plurality of electronic demonstration units of the medicament delivery device design evaluation apparatus 1" are all arranged in or on a housing 10". The housing 10" in this example has the shape of a handhold injector. The plurality of electronic demonstration units may comprise first, second, third and fourth electronic demonstration units 1"*a*, 1"*b*, 1"*c*, 1"*d*.

The user may have an input on the user interface of the control device 2; such a use input may be a) providing a start visual indication; b) using a temperature sensor to detect skin contact; c) continuing to monitor skin contact; d) providing an end visual indication; e) providing an interrupt alarm (if the medicament delivery is interrupted); and f) sending a message to a remote start device 4 if the medicament delivery is interrupted.

As illustrated by FIG. 8, the second electronic demonstration unit 1"*b* receives the control signal 3 from the control device 2, then the second electronic demonstration unit 1"*b* provides a light indication as the start indication. The second electronic demonstration unit 1"*b* also sends a secondary control signal 100" to the first and the fourth electronic demonstration units 1"*a*, 1"*d*.

The first electronic demonstration units 1"*a* start to count a medicament delivery time period and display a visual indication when the time period passes. The fourth electronic demonstration unit 1*d"* starts to count a medicament delivery time period and detects a predetermined temperature (used to indicate skin contact); if the detection changes rapidly before the time period passes, the fourth electronic demonstration unit 1*d"* sends a further control signal 101" to the third electronic demonstration unit to generate a visual indication as the interrupt alarm; and the fourth electronic demonstration unit 1*d"* also sends a message 102" to the remote smart device 4.

It should be noted that, alternatively, the control signal 3 can be sent to multiple or even all electronic demonstration units of the plurality of electronic demonstration units of the medicament delivery device design evaluation apparatus 1; 1'; 1".

The medicament delivery device design evaluation apparatus can be used to facilitate a discussion between different users, for example before making a prototype that is closer to the final product. Especially, the medicament delivery device design evaluation apparatus can be used to demonstrate the electronic function that is planned to be used in a medicament delivery device or an add-on device/accessory device that is usually used with or attached to a medicament delivery device, e.g. a monitoring device, so that the user is able to observe the performance of the planned-to-be-used indication, not only shown on the medicament delivery device itself, but around the medicament delivery device (as an add-on).

The recently disclosed concept has mainly been described above with reference to a few examples. However, as is readily appreciated by a person skilled in the art, other embodiments than the ones disclosed above are equally possible within the scope of the recently disclosed concept, as defined by the appended claims.

The invention claimed is:

1. A medicament delivery device design evaluation apparatus comprising:
   a plurality of electronic demonstration units, where each electronic demonstration unit comprises a set of electronics that comprises a data receiver and at least one of an indication unit and a data transmitter,
   wherein the plurality of electronic demonstration units are configured to provide a first indication when at least one of the plurality of electronic demonstration units receives a first control signal, wherein the first indication is a first type of indication comprising at least one of a visual indication, an audible indication, a tactile indication, or a message sent by the data transmitter,
   wherein the plurality of electronic demonstration units are configured to provide a second indication when at least one of the plurality of electronic demonstration units receives a second control signal, wherein the second indication is a second type of indication, different than the first type of indication, the second type of indication comprising at least one of a visual indication, an audible indication, a tactile indication, or a message sent by the data transmitter, and wherein the first indication and the second indication are configured to be provided at the same time.

2. The medicament delivery device design evaluation apparatus as claimed in claim 1, wherein the medicament delivery device design evaluation apparatus comprises a control device configured to send the first control signal to at least one of the plurality of electronic demonstration units.

3. The medicament delivery device design evaluation apparatus of claim 2, wherein the control device comprises a user interface, a communication unit, a memory that stores a set of instructions for evaluating a design of a medicament delivery device, and one or more processors; wherein the one or more processors are configured to use the set of instructions to:

receive a user input from the user interface;
send the first control signal based on the user input; and
wherein the first control signal is sent from the communication unit to the data receiver of at least one of the plurality of electronic demonstration units.

4. The medicament delivery device design evaluation apparatus as claimed in claim 1, wherein the set of electronics of at least one of the plurality of electronic demonstration units comprises a sensor.

5. The medicament delivery device design evaluation apparatus as claimed in claim 1,
wherein each electronic demonstration unit comprises a housing; and
wherein the set of electronics of each electronic demonstration unit is arranged in or on the housing.

6. The medicament delivery device design evaluation apparatus as claimed in claim 5, wherein each electronic demonstration unit comprises a battery arranged in or on the housing.

7. The medicament delivery device design evaluation apparatus as claimed in claim 1, wherein the plurality of electronic demonstration units comprises a housing; and wherein all of the plurality of electronic demonstration units are arranged in or on the housing.

8. The medicament delivery device design evaluation apparatus as claimed in claim 5, wherein the plurality of electronic demonstration units are detachable from the housing.

9. The medicament delivery device design evaluation apparatus as claimed in claim 1, wherein each electronic demonstration unit comprises a processor.

10. The medicament delivery device design evaluation apparatus as claimed in claim 7 wherein some of the plurality of electronic demonstration units are arranged to connect with a processor.

11. The medicament delivery device design evaluation apparatus as claimed in claim 3, wherein the set of electronics of at least one of the plurality of electronic demonstration units comprises a sensor and where the user input comprises an event for being detected by the sensor, and wherein the at least one of the indication unit and the data transmitter in the electronic demonstration unit is configured to provide the first indication in accordance with the user input when at least one of the plurality of electronic demonstration units receives the first control signal and the event has been detected.

12. The medicament delivery device design evaluation apparatus as claimed in claim 11, wherein the sensor is at least one of a vibration sensor, microphone, gyroscope, accelerometer, inertia sensor, proximity sensor, light sensor, temperature sensor, image sensor, capacitance sensor, impedance sensor and gesture sensor.

13. The medicament delivery device design evaluation apparatus as claimed in claim 1, wherein one of the plurality of electronic demonstration units comprises a data transmitter configured to send the second control signal after receiving the first control signal, and the data receiver of each of the other electronic demonstration units is configured to receive the second control signal.

14. The medicament delivery device design evaluation apparatus as claimed in claim 1, wherein each indication unit is at least one of a display, a light generator, a speaker, a buzzer, a temperature conditioner, and a vibration generator.

15. A medicament delivery device design evaluation apparatus comprising:

a plurality of electronic demonstration units, where each electronic demonstration unit comprises a set of electronics that comprises a data receiver and at least one of an indication unit and a data transmitter; and a control device comprising a processor and is configured to send a first control signal and a second control to at least one of the plurality of electronic demonstration units, wherein each electronic demonstration unit comprises a housing and a battery arranged in or on the housing, wherein the plurality of electronic demonstration units are configured to provide a first indication when at least one of the plurality of electronic demonstration units receives the first control signal wherein the first indication is a first type of indication comprising at least one of a visual indication, an audible indication, a tactile indication, or a message sent by the data transmitter, wherein the plurality of electronic demonstration units are configured to provide a second indication when at least one of the plurality of electronic demonstration units receives the second control signal, wherein the second indication is a second type of indication, different than the first type of indication, the second type of indication comprising at least one of a visual indication, an audible indication, a tactile indication, or a message sent by the data transmitter, wherein the set of electronics of at least one of the plurality of electronic demonstration units comprises a sensor, and wherein the first indication and the second indication are configured to be provided at the same time.

16. The medicament delivery device design evaluation apparatus of claim 15, wherein the control device further comprises a user interface, a communication unit, and a memory that stores a set of instructions for evaluating a design of a medicament delivery device, where the processor is configured to use the set of instructions to:

receive a user input from the user interface;
send the first control signal based on the user input; and
wherein the first control signal is sent from the communication unit to the data receiver of at least one of the plurality of electronic demonstration units.

17. The medicament delivery device design evaluation apparatus as claimed in claim 15, wherein the sensor is at least one of a vibration sensor, microphone, gyroscope, accelerometer, inertia sensor, proximity sensor, light sensor, temperature sensor, image sensor, capacitance sensor, impedance sensor and gesture sensor.

18. The medicament delivery device design evaluation apparatus as claimed in claim 15, wherein each indication unit is at least one of a display, a light generator, a speaker, a buzzer, a temperature conditioner, and a vibration generator.

\* \* \* \* \*